United States Patent [19]

Dorrestijn

[11] 4,233,371
[45] Nov. 11, 1980

[54] METHOD FOR THE MANUFACTURE OF AN ELECTROCHEMICAL CELL OR BATTERY AND BATTERY MADE BY THE METHOD

[75] Inventor: Antoon Dorrestijn, Grevenbicht, Netherlands

[73] Assignee: Electrochemische Energieconversie N.V., Mol, Belgium

[21] Appl. No.: 74,099

[22] Filed: Sep. 10, 1979

[30] Foreign Application Priority Data

Sep. 13, 1978 [NL] Netherlands ............ 7809298

[51] Int. Cl.³ ............................................ H01M 6/46
[52] U.S. Cl. .................................. 429/152; 429/162; 29/623.2; 29/623.4
[58] Field of Search ................................. 429/149–155, 429/162; 29/623.1, 623.5

[56] References Cited

U.S. PATENT DOCUMENTS 4,068,047    1/1978    Dangel et al. .................... 429/152 X Primary Examiner—Charles F. LeFevour
Attorney, Agent, or Firm—Cushman, Darby & Cushman

[57] ABSTRACT

The invention relates to a method for the manufacture of an electrochemical cell or battery, consisting of a stack of plate-shaped elements, each of which consists of a sheet or plate of electrode material which is mounted in a frame made of electrically insulating fibrous-web material impregnated with a non-polymerized thermosetting synthetic material, which elements in a first compression molding stage are heated under pressure for a relatively short primary time at a relatively low primary temperature under which conditions the thermosetting synthetic material flows well but polymerizes only to a minor degree, thereafter the elements are combined with other battery components are stacked into an electrochemical cell package which in a second compression molding stage is formed into a coherent block by compression for a relatively long secondary time and at a relatively high secondary temperature to set the thermosetting synthetic material.

12 Claims, 7 Drawing Figures

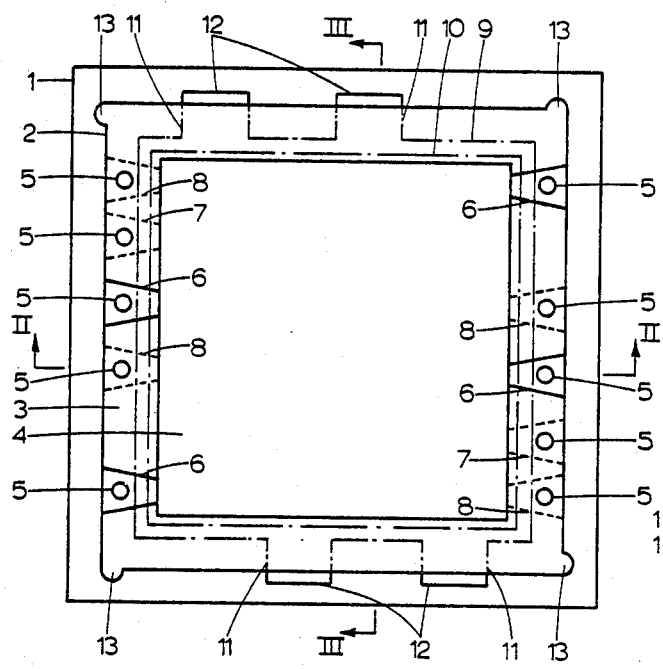
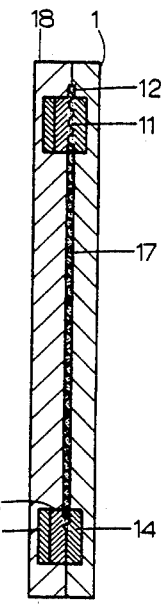
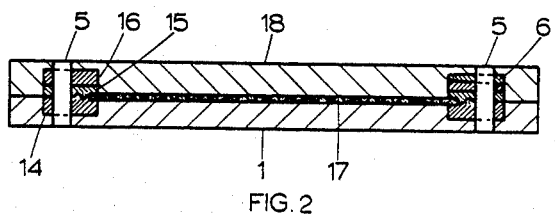
FIG. 1
FIG. 3
FIG. 2

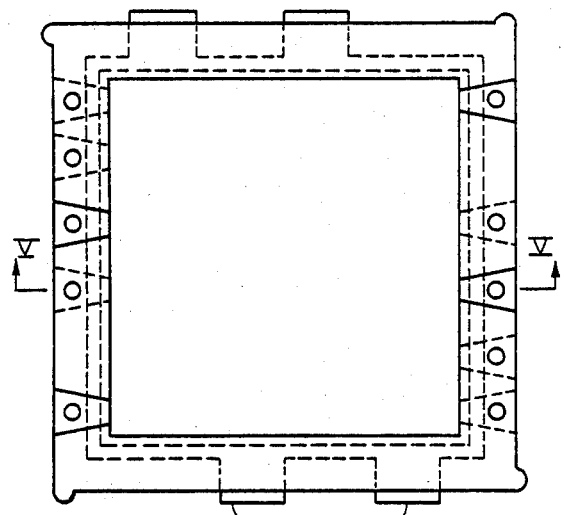
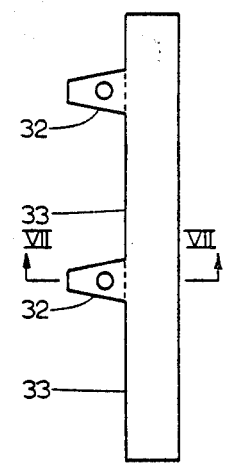
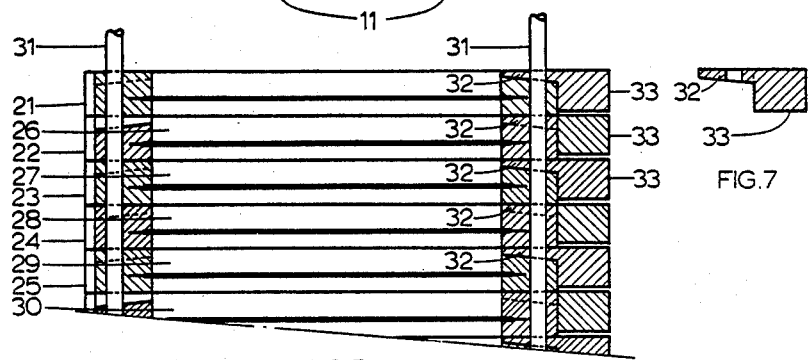

METHOD FOR THE MANUFACTURE OF AN ELECTROCHEMICAL CELL OR BATTERY AND BATTERY MADE BY THE METHOD

BACKGROUND OF THE INVENTION

1. Field of the Invention

The invention relates to a method for the manufacture of an electrochemical cell or battery, for example a fuel cell or fuel-cell battery, consisting of a stack of plate-shaped elements, including at least two electrode elements, each of which consists of a sheet or plate of electrode material which is mounted in a frame made of electrically insulating fibrous-web material impregnated with a thermosetting synthetic material, which elements, prior to setting, are stacked to form package of the desired composition in such a way that gas or liquid chambers are formed between the elements, after which the stack is subjected to a compression molding operation at a temperature causing the thermosetting synthetic material to polymerize, thus forming the stack into a coherent block.

2. Description of the Prior Art

One prior art method is described in Dutch Pat. application No. 75 09675, laid open for inspection. According to this known method, a fibrous web containing non-polymerized thermosetting synthetic material is stuck onto one side or both sides of a band of electrode material at a temperature at which the thermosetting synthetic material is adhesive but does not yet polymerize. The bands thus obtained are cut into plate-shaped elements which are stacked to form a package of the desired composition, while in most cases strips, not adhering to the synthetic material, are placed between the elements in order to form the channels which are required in the finished cell or battery,. Subsequently, the stacked package is for a certain time at a certain pressure exposed to a temperature at which the thermosetting synthetic material polymerizes. The flowing of the synthetic material causes the sheets of electrode material to be bonded to the frames, while the frames are bonded to each other as well, so that the stack is formed into a coherent block. Next, the strips are pulled out of the channels which have been formed, and the open ends of the channels at the outside of the block are sealed off.

It has been found that electrochemical cells or batteries manufactured according to this known method may exhibit the undesirable phenomenon of decreased cell performance after manufacture resulting from the improper bonding of the sheets or plates or electrode material in the finished block which is not sufficiently impermeable to gas or liquid, so that leakage may occur between the various gas or liquid chambers, which of course seriously interferes with proper functioning of the cell or battery. Inferior bonding may also occur along the edges of the channels which have been formed by means of strips. This imperfect bonding is believed to be attributable to the fact that the heating of the rather thick stacked package proceeds so slowly that the temperature at which the non-polymerized synthetic material would flow sufficiently to effect proper bonding is locally reached only when the polymerization (setting) of the thermosetting synthetic material has advanced so far already that the material can no longer flow sufficiently. The purpose of the invention is to provide a method which does not have this drawback.

SUMMARY OF THE INVENTION

According to the invention, the present method is characterized in that in a first compression molding operation stage the individual plate-shaped elements are manufactured by placing a sheet of electrode material in a press mold between frame sections made of electrically insulating fibrous web impregnated with a nonpolymerized thermosetting synthetic material and heating the assembly under pressure for a relatively short primary time at a relatively low primary temperature, at which temperature the thermosetting synthetic material flows well, but polymerizes only to a minor degree at most, after which the resulting plate-shaped elements, together with any other cell or battery components, are stacked into a package of the desired composition, which package in a second compression molding operation stage is formed into a coherent block by compressing it for a relatively long secondary time and at a relatively high secondary temperature, at which the thermosetting synthetic material sets.

The aforesaid relatively short primary time preferably amounts to 5 to 60 seconds, the aforesaid relatively low primary temperature preferably to 70° to 90° C., depending on the thermosetting synthetic material used. The entire thin frame of the electrode element is very rapidly heated to a temperature at which the viscosity of the synthetic material is low enough to enable it to flow and cover the edges of the electrode material so as to form a gas and liquid tight bonding. Owing to the short duration of the heating, hardly any polymerization takes place. Preferably, the mold is then cooled as fast as possible, so that still hardly any polymerization takes place. Polymerization and setting occur in the second compression molding step. In this step, the aforesaid relatively long secondary time in which the stack is heated and formed into a block preferably amounts to 10 to 60 minutes, while the aforesaid relatively high secondary temperature preferably amounts to 110° to 180° C.

In the first compression molding step, the press mold is preferably provided with insert pieces, the dimensions and position of which correspond with those of the strips to be placed in the stacked package for formation of channels. The effect of this is that hollow spaces are previously provided there in the elements, so that the channels need not be formed in the second compression molding step through flowing of the synthetic material, thus eliminating the cause of inferior bonding along the edges of the channels.

The insulating fibrous web material should of course be resistant against the liquid and gases to be used in the cell, mechanically stable and sufficiently strong at the operating temperature of the cell, which is between 50° and 200° C., for example. Preferably therefore, fibrous web material is used which consists of glass fibers, but also other insulating fibrous-web materials which meet said requirements may be used, such as for instance asbestos fibers or other inorganic fibers, polyester fibers, polyamide fibers or other organic fiber material, and mixtures of various kinds of fiber material. The use of fabrics, for instance nylon fabric, must also be regarded as belonging to the essence of the invention.

The thermosetting synthetic material as well should be resistant against the liquids and gases to be used in the cell, mechanically stable and sufficiently strong.

Eligible materials are for instance, modified or unmodified polyesters, epoxy resins, polyvinyl esters, polyacrylates, etc. Epoxy resins are preferred.

For cells and batteries using hydrogen and air as fuel and oxidant, respectively, and an aqueous potassium hydroxide solution as electrolyte, a very suitable material combination is glass fiber web impregnated with expoxyresin Eurepot 730 and Schering's Eurodur 42 (a cycloaliphatic amine) as hardening agent. This combination of expoxy resin and hardening agent, in a 4 to 1 ratio, has a setting time of about 30 minutes at 150° C.

DESCRIPTION OF THE DRAWINGS

The invention will be further elucidated with reference to the annexed diagrammatic drawing and by way of non-restrictive example. The figures represent the following:

FIG. 1: top view of the lower part of an opened mold for compression molding of separate plate-shaped elements;

FIG. 2: a cross-section of a closed mold along II—II in FIG. 1, within it a sheet of electrode material placed between frame sections;

FIG. 3: a similar cross-section, here along III—III in FIG. 1;

FIG. 4: top view of an unfinished package of stacked elements;

FIG. 5: a cross-section of this package along V—V in FIG. 4.

FIG. 6: top view of a set of strips to be inserted into the stack for formation of channels, which strips are interconnected by a transverse strip;

FIG. 7: a cross-section along VII—VII in FIG. 6.

DETAILED DESCRIPTION OF THE INVENTION

For the sake of clarity, the figures have not been drawn to scale; in the direction normal to the plane of the electrode, a considerably larger scale has been used than parallel to this plane. Like parts are indicated by the same reference number in all figures.

In FIG. 1, the number 1 indicates the lower half of a mold for the manufacture of the plate-shaped elements, with a mold cavity 2. The edge 3 of the mold cavity, where the bottom frame section will come, is deeper than the middle section 4, where the sheet of electrode material will come. The mold has been provided with pins 5, which correspond with orifices in the frame sections at the places where continuous channels are to come in the finished block; the pins 5 are meant to keep these orifices open during the compression molding of the plate-shaped element. Some of the pins 5 have been provided with insert pieces 6, which are meant to form recesses at the places in the plate-shaped elements where transverse channels are to be formed. The insert pieces indicated are positioned at the places where electrolyte channels are to be formed; when pressing a plate-shaped element in which fuel channels or air channels must be pre-formed, the insert pieces are put in the position as indicated by dashed lines at 7 and 8, respectively. The chain-dotted line 9 indicates the place of the outer edge of the sheet of electrode material to be laid in the mold; in the area between the line 9 and the chain-dotted line 10, which is further inward, the collector gauze of the electrode sheet has been stripped of all other layers. This border of bare gauze has been provided with contact lugs 11, the ends of which will come in shallow recesses 12 of the mold cavity. The recesses 13 at the corners of the mold cavity serve to take up excess of synthetic material during the pressing.

FIG. 2 and FIG. 3 show two cross-sections of the closed mold, inside of which are frames 14, 15 and 16 and the sheet of electrode material 17. The upper half 18 of the mold in this design has a deeper cavity for the frames than the lower half, in order to accommodate two frames (15 and 16), one on top of the other; this extra thickness is needed for the forming of the desired recesses by means of the insert pieces 6. The outer part (between the lines 9 and 10 in FIG. 1) of the border of the electrode sheet 17 between the frames has been stripped; at the inner side, a narrow border (a few mm wide) of non-stripped electrode sheet is left, held between the frames. This last is desirable for the purpose of proper sealing; during the compression molding, the synthetic material permeates the bare gauze at the border of the sheet, so that good bonding is effected between the gauze and the frames as well as between frames, while further the synthetic material forms a sealing connection with the narrow non-stripped border of electrode material between the frames.

In the unfinished stacked package represented in FIG. 4 and FIG. 5, the topmost electrode element 21 is an element with an air electrode, the construction of which has been illustrated in the FIGS. 1-3; the top view in FIG. 4 is thus also the top view of this plate-shaped element. FIG. 5 shows some other plate-shaped elements, indicated by the reference FIGS. 22-25. The element 22 contains an air electrode again; between the electrodes of the elements 21 and 22, an air chamber 26 is formed. The elements 23 and 24 are provided with gas (fuel) electrodes; between the electrodes in the elements 22 and 23, an electrolyte chamber 27 is formed, and between the electrodes of the elements 23 and 24 a gas (fuel) chamber 28 and next between the elements 24 and 25 another electrolyte chamber 29 and under the element 25, which contains an air electrode again, another air chamber 30, etc.

Through the stack, pins 31 have been inserted, which have the same function as the pins 5 in FIG. 1 and FIG. 2, viz. keeping open the continuous supply channels for the various fluids (air, fuel, electrolyte) during compression molding. As indicated in FIG. 5 at the right-hand side, strips 32 are inserted between the plate-shaped elements at the places of the preformed recesses therein (6, 7 and 8 in FIG. 1), which strips serve to keep open the channels to be formed in the finished pressed block at the places of these recesses. The strips 32 are of such a trapezoidal shape that they can be removed from the finished block without difficulty. As indicated in the FIGS. 5, 6 and 7, the ends of the strips 32 protruding from the stack are attached to traverse strips 33, which preferably have such a thickness that they come to rest against each other during the compression molding of the block and thus limit the measure of compression, as has already been described in the aforementioned Dutch Pat. application No. 75 09675, laid open for inspection.

If necessary, porous spacers (not shown in the drawing) may be placed in the chambers when the stack is made to prevent contact between any not fully flat electrodes. These may consist of, for instance, corrugated, perforated plates or fabrics of, for instance, polypropylene, or fibrous webs of polypropylene or polytetrafluoroethylene.

The method according to the invention is not restricted to the example given; the materials and forms referred to have only been mentioned by way of example. Although in the above only cells for gaseous fuel and with oxygen as oxidant have been mentioned, the invention should be deemed to include the manufacture, in accordance with the method described herein, of stacked cells or stacked batteries for liquid fuel and/or with a gaseous or liquid oxidant other than oxygen. Also electrochemical cells other than fuel cells can be manufactured by the method according to the invention, such as electrolysis cells and electrodialysis cells. By the method according to the invention, electrochemical cells or batteries can be manufactured in which the electrolyte chambers are subdivided into several compartments by means of, for instance, semipermeable or ion-exchanging membranes. The membrane material is treated in a similar manner as the electrode material, so that stack elements are obtained, which are inserted at the desired places when stacking the package. Also these and similar variants should be deemed to be within the spirit and scope of the invention.

The invention as will be understood also relates to an electrochemical cell or battery, for instance a fuel cell or battery, manufactured by the method according to the invention.

What is claimed is:

1. A method for the manufacture of an electrochemical cell or battery, consisting of a stack of plate-shaped elements, including at least two electrode elements, each of which consists of a sheet or plate of electrode material which is mounted in a frame made of an electrically insulating fibrous-web material impregnated with a thermosetting synthetic material, which elements, prior to setting, are stacked to form a package of the desired composition in such a way that gas or liquid chambers are formed between the elements, after which the stack is subjected to a compression molding operation at a temperature causing the thermosetting synthetic material to polymerize, thus forming the stack into a coherent block, wherein the improvement comprises the steps of employing a first compression molding operation stage wherein the individual plate-shaped elements are manufactured by placing a sheet of electrode material in a press mold between frame sections made of electrically insulating fibrous web impregnated with a non-polymerized thermosetting synthetic material and heating the assembly under pressure for a relatively short primary time at a relatively low primary temperature, at which temperature the thermosetting synthetic material flows well, but polymerizes only to a minor degree at most, after which the resulting plate-shaped elements, together with any other cell or battery components, are stacked into a package of the desired composition, which package in a second compression molding operation stage is formed into a coherent block by compressing it for a relatively long secondary time and at a relatively high secondary temperature, at which the thermosetting synthetic material sets.

2. The method according to claim 1, wherein said relatively short primary time is in the range of about 5 to 60 seconds.

3. The method according to claim 1 or 2 wherein said relatively low primary temperature is in a range of about 70° to 90° C.

4. The method according to claim 1 or 2 wherein said relatively long secondary time is in the range of about 10 to 60 minutes.

5. The method according to claims 1 or 2 wherein said relatively low primary temperature is in the range of about 70° to 90° C. and said relatively long secondary time is in the range of about 10 to 60 minutes.

6. The method according to one of the claims 1 or 2 wherein said relatively high secondary temperature is in the range of about 110° to 180° C.

7. The method according to claim 1 or 2 wherein said relatively low primary temperature is in the range of about 70° to 90° C., said relatively long secondary time is in the range of about 10 to 60 minutes and said relatively high secondary temperature is in the range of about 110° to 180° C.

8. The method according to one of the claims 1 or 2 wherein said press mold for the primary compression molding operation includes the further step of employing insert pieces, the dimensions and position of which correspond to the strips to be placed in the stacked package for the formation of channels.

9. The method according to one of the claims 1 or 2 wherein said press mold for the primary compression molding operation includes the further steps of employing pins, the dimensions and place of which correspond with those of the desired continuous channels through the elements in the finished block.

10. The method according to claim 9 wherein the stacked package has been provided with pins, the dimensions and place of which correspond with those of the desired continuous channels through the finished block.

11. The method according to one of the claims 1 or 2 wherein the thermosetting synthetic material is an epoxy resin.

12. An electrochemical cell or battery constructed in accordance with claim 1 or 2.

* * * * *